US007085997B1

(12) United States Patent
Wu et al.

(10) Patent No.: US 7,085,997 B1
(45) Date of Patent: Aug. 1, 2006

(54) NETWORK-BASED BOOKMARK MANAGEMENT AND WEB-SUMMARY SYSTEM

(75) Inventors: Jonathan Wu, Mountain View, CA (US); Sreeranga P. Rajan, Santa Clara, CA (US)

(73) Assignee: Yodlee.com, Sunnyvale, CA (US)

( * ) Notice: Subject to any disclaimer, the term of this patent is extended or adjusted under 35 U.S.C. 154(b) by 0 days.

(21) Appl. No.: 09/575,491

(22) Filed: May 18, 2000

Related U.S. Application Data

(63) Continuation-in-part of application No. 09/323,598, filed on Jun. 1, 1999, now Pat. No. 6,199,077, which is a continuation-in-part of application No. 09/208,740, filed on Dec. 8, 1998, now Pat. No. 6,412,073, application No. 09/550,348, filed on Apr. 14, 2000.

(51) Int. Cl.
*G06F 15/00* (2006.01)
*G06F 17/00* (2006.01)
*G06F 17/21* (2006.01)

(52) U.S. Cl. ............... 715/501.1; 715/526; 709/224
(58) Field of Classification Search ............ 715/501.1, 715/526; 709/224; 707/10
See application file for complete search history.

(56) References Cited

U.S. PATENT DOCUMENTS

| 5,708,825 | A |   | 1/1998 | Sotomayor |  |
|---|---|---|---|---|---|
| 5,790,793 | A |   | 8/1998 | Higley |  |
| 5,813,007 | A |   | 9/1998 | Nielsen |  |
| 5,961,601 | A | * | 10/1999 | Iyengar | 709/229 |
| 5,978,828 | A | * | 11/1999 | Greer et al. | 709/224 |
| 6,009,429 | A | * | 12/1999 | Greer et al. | 707/10 |
| 6,032,162 | A |   | 2/2000 | Burke |  |
| 6,199,077 | B1 | * | 3/2001 | Inala et al. | 715/501.1 |
| 6,412,073 | B1 | * | 6/2002 | Rangan | 713/202 |
| 6,517,587 | B1 | * | 2/2003 | Satyavolu et al. | 715/501.1 |
| 6,572,662 | B1 | * | 6/2003 | Manohar et al. | 715/526 |
| 6,633,910 | B1 | * | 10/2003 | Rajan et al. | 709/224 |

FOREIGN PATENT DOCUMENTS

EP 0747843 A1 12/1996

OTHER PUBLICATIONS

Maarek, Yoelle S. et al., Automatically Organizing Bookmarks per Contents, Fifth International World Wide Web Conference, May 10, 1996, pp. 1-16.*
Joachims, T. et al., WebWatcher: A Tour Guide for the World Wide Web, Proceedings of the 1997 IJCAI, Aug. 1997, pp. 1-6.*

(Continued)

*Primary Examiner*—William Bashore
(74) *Attorney, Agent, or Firm*—Donald R. Boys; Central Coast Patent Agency, Inc.

(57) ABSTRACT

A network-based URL management and data gathering system is provided. The system utilizes a client-side utility for capturing URLs during normal Web browsing, and a server-side utility for organizing and managing the captured URLs on the network. The server-side utility periodically sends a request to a proxy browsing and data gathering utility for navigating to and retrieving data from Web pages associated with the captured URLs. Data retrieved from the Web pages is returned in summary form for presentation to subscribing users. In preferred embodiments, the system is practiced on the Internet network between users operating an Internet-capable appliance having an Internet connection, and an Internet portal service.

10 Claims, 9 Drawing Sheets

OTHER PUBLICATIONS

Lieberman, Henry, Autonomous interface agents, ACM conference on Human Factors and Computing Systems, Mar. 27, 1997, pp. 67-74.*

Ashlin Weekly Update, Apr. 3, 1999, downloaded from <http://www.ashlin.ca/news/HTM/19990403.htm> on Nov. 22, 2005, pp. 1-2.*

Davies, N.J. et al., "Knowledge Sharing Agents Over the World Wide Web", BT Technology Journal, Jul. 1, 1998, pp. 104-109, vol. 16, No. 3, BT Laboratories, GB.

Marais, H. et al., "Supporting Cooperative and Personal Surfing with a Desktop Assistant", Proceedings of the ACM Symposium on User Interface Software and Technology, 10th Annual Symposium, UIST '97, Proceedings of 10th Annual Symposium on User Interface Software and Technology, Banff, Alberta., Canada, Oct. 14-17, 1997, pp. 129-138, ACM, New York, US.

Li W-S et al., "PoweBookmarks: A System for Personalizable Web Information Organization, Sharing and Management", May 17, 1999, pp. 1375-1389, vol. 31, No. 11-16, Computer Networks, Elsevier Science Publishers B.V. Amsterdam, NL.

Barrett, R et al., "How to Personalize the Web", Chi 97, Human Factors in Computing Systems, Atlanta, Mar. 22-27, 1997, pp. 75-82, Conference on Human Factors in Computing Systems, ACM, New York, US.

* cited by examiner

NETWORK-BASED BOOKMARK MANAGEMENT AND WEB-SUMMARY SYSTEM

CROSS-REFERENCE TO RELATED DOCUMENTS

The present invention is a continuation in part (CIP) to a U.S. patent application Ser. No. 09/323,598 entitled "Method and Apparatus for Obtaining and Presenting WEB Summaries to Users" filed on Jun. 1, 1999, now U.S. Pat. No. 6,199,077, which is a CIP to a U.S. patent application Ser. No. 09/208,740 entitled "Method and Apparatus for Providing and Maintaining a User-Interactive Portal System Accessible via Internet or other Switched-Packet-Network" filed on Dec. 8, 1998, now U.S. Pat. No. 6,412,073, disclosure of which is incorporated herein in its entirety herein by reference. It is also a CIP to U.S. patent application Ser. No. 09/550,348, filed Apr. 14, 2000, entitled "Method and Apparatus for Providing Auto-Registration and Service Access to internet Sites for Internet Portal Subscribers".

BACKGROUND OF THE INVENTION

The information network known as the World Wide Web (WWW), which is a subset of the well-known Internet, is arguably the most complete source of publicly accessible information available. Anyone with a suitable Internet appliance such as a personal computer with a standard Internet connection may access (go on-line) and navigate to information pages (termed web pages) stored on Internet-connected servers for the purpose of garnering information and initiating transactions with hosts of such servers and pages.

Many companies offer various subscription services accessible via the Internet. For example, many people now do their banking, stock trading, shopping, and so forth from the comfort of their own homes via Internet access. Typically, a user, through subscription, has access to personalized and secure WEB pages for such functions. By typing in a user name and a password or other personal identification code, a user may obtain information, initiate transactions, buy stock, and accomplish a myriad of other tasks.

One problem that is encountered by an individual who has several or many such subscriptions to Internet-brokered services is that there are invariably many passwords and/or log-in codes to be used. Often a same password or code cannot be used for every service, as the password or code may already be taken by another user. A user may not wish to supply a code unique to the user such as perhaps a social security number because of security issues, including quality of security, that may vary from service to service. Additionally, many users at their own volition may choose different passwords for different sites so as to have increased security, which in fact also increases the number of passwords a user may have.

Another issue that can plague a user who has many passworded subscriptions is the fact that they must bookmark many WEB pages in a computer cache so that they may quickly find and access the various services. For example, in order to reserve and pay for airline travel, a user must connect to the Internet, go to his/her book-marks file and select an airline page. The user then has to enter a user name and password, and follow on-screen instructions once the page is delivered. If the user wishes to purchase tickets from the WEB site, and wishes to transfer funds from an on-line banking service, the user must also look for and select the personal bank or account page to initiate a funds transfer for the tickets. Different user names and passwords may be required to access these other pages, and things get quite complicated.

Although this preceding example is merely exemplary, it is generally known that much work related to finding WEB pages, logging in with passwords, and the like is required to successfully do business on the WEB.

A service known to the inventor, and described in the related case Ser. No. 09/208,740 listed under the cross-reference to related documents section, provides a WEB service that allows a user to store all of his password protected pages in one location such that browsing and garnering information from them is much simplified. A feature of the above service allows a user to program certain tasks into the system such that requested tasks are executed by an agent (software) based on user instruction. The service stores user password and log-in information and uses the information to log-in to the user's sites, thus enabling the user to navigate without having to manually input log-in or password codes to gain access to the links.

The above-described service uses a server to present a user-personalized application that may be displayed as an interactive home page that contains all of his listed sites (hyperlinks) for easy navigation. The application lists the user's URL's in the form of hyperlinks such that a user may click on a hyperlink and navigate to the page wherein login, if required, is automatic, and transparent to the user.

The application described above also includes a software agent that may be programmed to perform scheduled tasks for the user including returning specific summaries and updates about user-account pages. A search function is provided and adapted to cooperate with the software agent to search user-entered URL's for specific content if such pages are cached somewhere in their presentable form such as at the portal server, or on the client's machine.

An enhancement to the system described above and known to the inventors is taught in Ser. No. 09/323,598, also included in the cross-reference section. In this teaching a summary software agent is provided to execute on the Portal server. The summary software agent is adapted to access Internet destinations, retrieve information according to pre-programmed criteria, and summarize the retrieved information for delivery to the subscriber.

In addition to the summary agent, a configuration and initiation interface is provided for a subscriber to set up and start a summary search. Summary searches may be configured for individual clients as templates stored and retrieved at the Internet-connected server. In some cases summary information is stored to be later downloaded at request of the subscriber, and in others the information is immediately pushed to the client/subscriber. Also in some embodiments automatic log-ins are performed for the subscriber at each Internet site according to a data stored for the subscriber at the Portal server.

It has occurred to the inventor that in addition to ordering WEB-summaries from a service through an interactive configuration and initiation interface, a user may desire that certain URLs be periodically summarized for content without the prerequisite of user configuration of the site for obtaining the information. Further, a user may desire to be empowered with control ability to effect or cancel such action without having to navigate to a special section of the service's Portal server for the purpose of deleting or editing information stored in user-profiled sites.

What is clearly needed is a network-based bookmark management and WEB-summary system that may be controlled from a single user interface while a user is actively browsing the Internet. Such a system would empower users with an efficient method for ordering periodic and automatic WEB-summaries for certain WEB-sites without the prerequisite of pre-configuration.

SUMMARY OF THE INVENTION

According to an embodiment of the present invention, a software application for network-based management and data summarization of user-selected URLs is provided. The software application includes a client-side utility for capturing a URL displayed in a browser window during Internet navigation, a server-side utility for receiving URLs captured by the client-side utility, and a navigation and data-gathering utility for navigating to and gathering data from Web pages associated with the captured URLs.

In preferred embodiments, a user operating the client-side utility captures a URL during Web browsing wherein the URL is sent to the server-side utility at which time it may be utilized by the navigation and data-gathering utility for proxy navigation to a Web page associated with the URL and gathering data therefrom.

In one aspect, the client-side utility is a network-capable utility separate from a standard book-marking utility. In other embodiments, the client-side utility is a network-capable utility that is integrated with a standard book-marking utility available in most Web browsers. In a preferred embodiment, the client-side utility is a Java-based plug-in adapted to a Web browser. In this mode, captured URLs are sent to the server-side utility where they are included in a list of URLs managed by the service. In all aspects, the navigation and data-gathering utility navigates to a WEB page associated with the URL and returns an HTML summary.

In another aspect of the present invention, a method for practicing network-based management and data summarization of user-selected URLs is provided. The method includes the steps of, (a) initiating capture of a URL associated with a Web page presented in a browser window while m) browsing the Internet; (b) sending the captured URL information over a network connection to a Web-based server; (c) associating the captured URL information with other URL information contained in a list of URL data; (d) initiating a request containing the URL data and sending the request to a proxy navigation and data-gathering utility; and (e) upon approval of the request, navigating to the Web page or pages associated with the URL data for the purpose of obtaining information from the Web page and returning the information in summary form back to a requesting user.

In one aspect, the URL data is sent both to the network and to a machine cache residing on a user's machine in step a. In another aspect, a step is added between steps d and e enabling a user to edit a navigation request before it is initiated. In all aspects of the present invention, the method is automated once a user has selected a URL using the client-side utility. The method and apparatus of the present invention enables a user to receive periodic data updates associated with favorite Web pages without having to pre-configure each URL for data search and return. Various embodiments of the present invention are detailed below.

BRIEF DESCRIPTION OF THE DRAWING FIGURES

DESCRIPTION OF THE PREFERRED EMBODIMENTS

According to a preferred embodiment of the present invention, a unique Internet portal is provided and adapted to provide unique services to users who have obtained access via an Internet or other network connection from an Internet-capable appliance. Such an interface provides users with a method for storing many personal WEB pages and further provides search function and certain task-performing functions. The methods and apparatus of the present invention are taught in enabling detail below.

Figure 1:
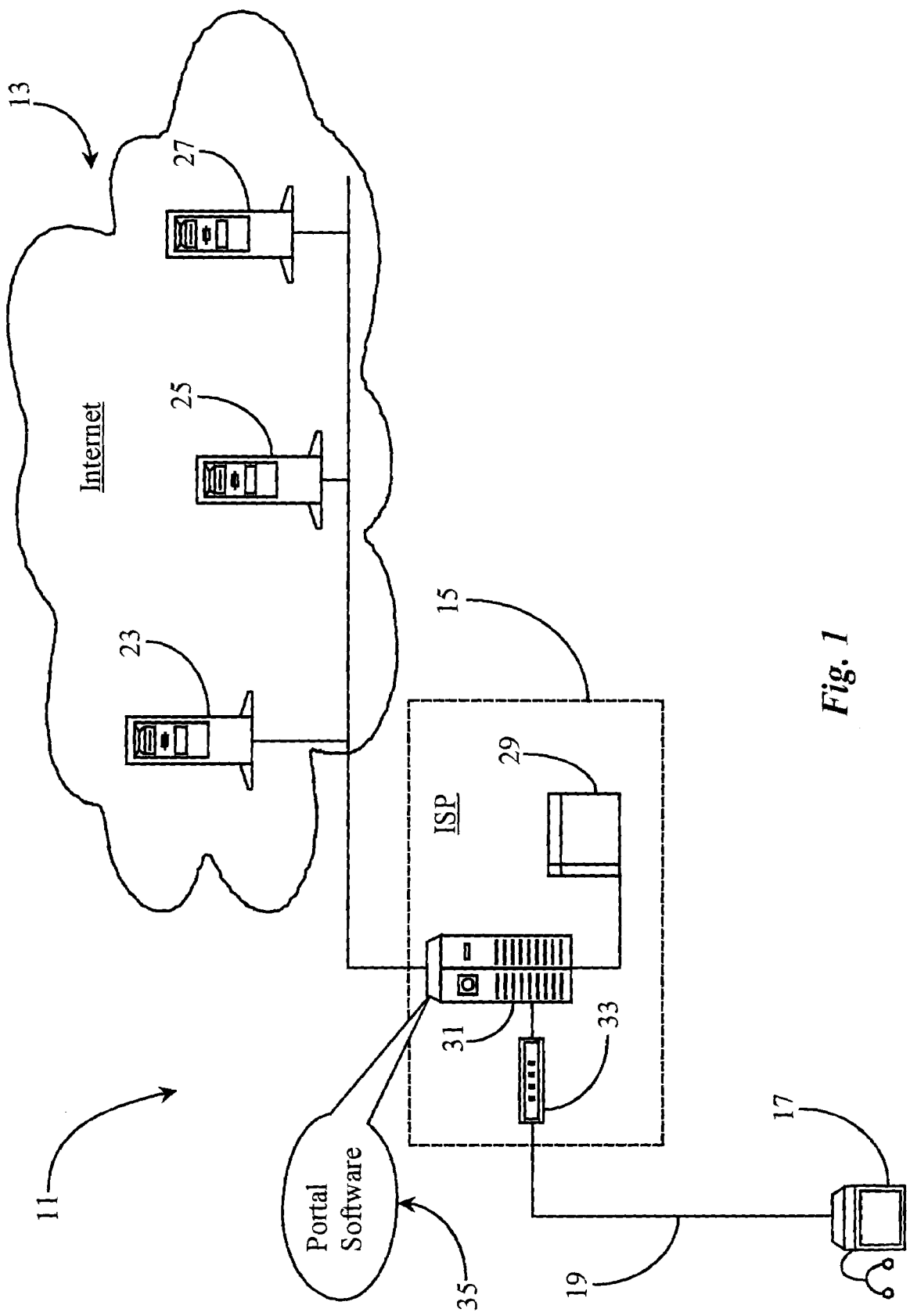
FIG. 1 is an overview of an Internet portal system and network according to an embodiment of the present invention.

FIG. 1 is an overview of an Internet portal system 11 and Internet network 13 according to an embodiment of the present invention. Portal system 11, in this embodiment, operates as an ISP in addition to a unique network portal, but may, in other embodiments be implemented as a stand-alone Internet server. In yet other embodiments the service and apparatus described herein may also be provided by such as a search and listing service (AltaVista™, Yahoo™) or by any other enterprise hosting a WEB-connected server.

Internet 13 is representative of a preferred use of the present invention, but should not be considered limiting, as the invention could apply in other networks and combinations of networks.

ISP 15 in this embodiment comprises a server 31, a modem bank 33, represented here by a single modem, and a mass storage repository 29 for storing digital data. The modem bank is a convenience, as connection to the server could be by another type of network link. ISP 15, as is typical in the art, provides Internet access services for individual subscribers. In addition to well-known Internet access services, ISP 15 also provides a unique subscription service as an Internet portal for the purpose of storing many WEB pages or destinations along with any passwords and or personal codes associated with those pages, in a manner described in more detail below. This unique portal service is provided by execution of Portal Software 35, which is termed by the inventors the Password-All suite. The software of the invention is referred to herein both as the Portal Software, and as the Password-all software suite. Also, in much of the description below, the apparatus of the invention is referred to by the Password-All terminology, such as the Password-All Server or Password-All Portal.

ISP 15 is connected to Internet 13 as shown. Other equipment known in the art to be present and connected to a network such as Internet 13, for example, IP data routers, data switches, gateway routers, and the like, are not illustrated here but may be assumed to be present. Access to ISP 15 is through a connection-oriented telephone system as is known in the art, or through any other Internet/WEB access connection, such as through a cable modem, special network connection (e.g. T1), ISDN, and so forth. Such connection is illustrated via access line 19 from Internet appliance 17 through modem bank 33.

In a preferred embodiment a user has access to Internet Password-All Portal services by a user name and password as is well known in the art, which provides an individualized WEB page to the subscriber. In another embodiment wherein a user has other individuals that use his or her Internet account, then an additional password or code unique to the user may be required before access to portal 31 is granted. Such personalized Portal WEB pages may be stored in repository 29, which may be any convenient form of mass storage.

Three Internet servers 23, 25, and 27, are shown in Internet 13, and represent Internet servers hosted by various enterprises and subscribed to by a user operating appliance 17. For example, server 23 may be a bank server wherein interactive on-line banking and account managing may be performed. Server 25 may be an investment server wherein investment accounts may be created and managed. Server 27 may be an airline or travel server wherein flights may be booked, tickets may be purchased, and so on. In this example, all three servers are secure servers requiring user ID and password for access, but the invention is not necessarily limited to just secure services.

In a preferred embodiment of the present invention, a subscribing user operating an Internet-capable appliance, such as appliance 17, connects to Password-All Portal system 11 hosted by ISP 15, and thereby gains access to a personalized, interactive WEB page, which in turn provides access to any one of a number of servers on Internet 13 such as servers 23, 25, and 27, without being required to enter additional passwords or codes. In a preferred embodiment the software that enables this service is termed Password-All by the inventors. Password-All may be considered to be a software suite executing on the unique server, and in some instances also on the user's station (client). Additional interactivity provided by portal software 35 allows a connected user to search his listed pages for information associated with keywords, text strings, or the like, and allows a user to program user-defined tasks involving access and interaction with one or more Internet-connected servers such as servers 23, 25, and 27 according to a pre-defined time schedule. These functions are taught in enabling detail below.

Figure 2:
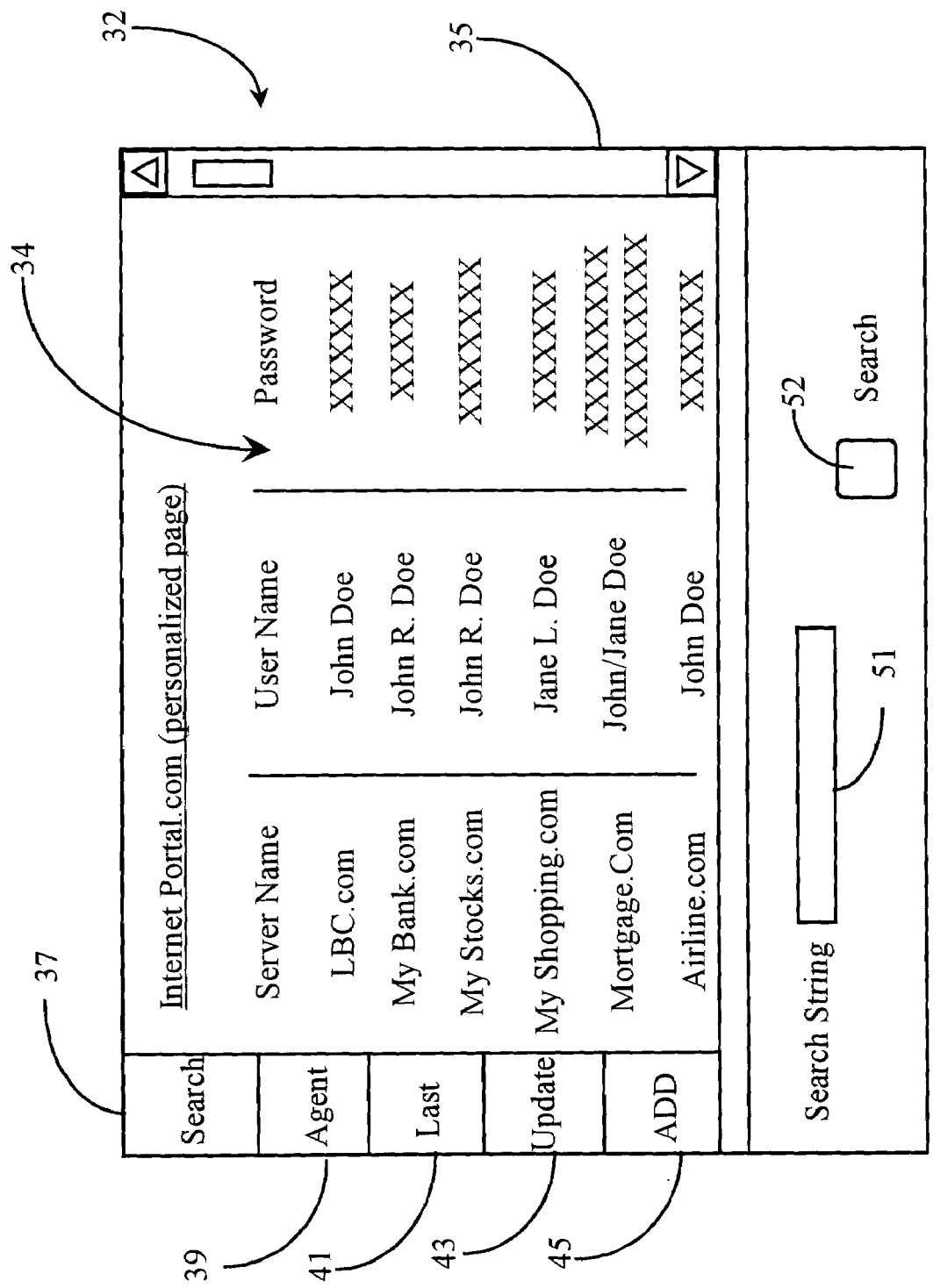
FIG. 2 is an exemplary plan view of a personalized Portal home page application as it may be seen on a display monitor according to an embodiment of the present invention.

FIG. 2 is an illustration of a personalized portal page as may be seen on a display monitor according to an embodiment of the present invention, provided by Password-All Portal software 35 executing on server 31, in response to secure access by a subscriber. Page 32 presents an interactive listing 34 of user-subscribed or member WEB pages, identified in this example by URL, but which may also be identified by any convenient pseudonym, preferably descriptive, along with user name and typically encrypted password information for each page. Listed in a first column under destination, are exemplary destinations LBC.com, My Bank.com, My Stocks.com, My shopping.com, Mortgage.com, and Airline.com. These are but a few of many exemplary destinations that may be present and listed as such on page 33. In order to view additional listings listed but not immediately viewable from within application 33, a scroll bar 35 is provided and adapted to allow a user to scroll up or down the list to enable viewing as is known in the art.

Items listed in list 34 in this example may be considered destinations on such as servers 23, 25, and 27 of FIG. 1. Typically the URL associated with an item on this list will not take a user to a server, per se, but to a page stored on a server. User names and password data associated with each item in list 34 are illustrated in respective columns labeled user name, and password, to the right of the column labeled destination. Each listing, or at least a portion of each listing, is a hyperlink invoking, when selected, the URL to that destination. In some instances a particular service may have more than one associated URL. For example, My Bank.com may have more than one URL associated for such as different accounts or businesses associated also with a single subscriber. In this case there may be a sub-listing for different destinations associated with a single higher-level listing. This expedient is not shown, but given this teaching the mechanism will be apparent to those with skill in the art.

In some embodiments one page 33 may be shared by more than one user, such as a husband and wife sharing a common account and subscription. An instance of this is illustrated herein with respect to the server labeled Mortgage.com wherein both a John and a Jane Doe are listed together under the column labeled user name. In another embodiment, a network of individuals, perhaps business owners, authorized co-workers, investment parties, or the like may share one application. In this way, at system 11 may be adapted for private individuals as well as business uses.

After gaining access to application 33 which is served via Internet portal server 31 of FIG. 1, a user may scroll, highlight, and select any URL in his or her list 34 for the purpose of navigation to that particular destination for further interaction. Application 33 already has each password and user name listed for each URL. It is not necessary, however, that the password and user name be displayed for a user or users. These may well be stored transparently in a user's profile, and invoked as needed as a user makes selections. Therefore, a user is spared the need of entering passwords and user names for any destinations enabled by list 34. Of course, each list 34 is built, configured and maintained by a subscribing user or users, and an editing facility is also provided wherein a user may edit and update listings, including changing URL's adding and deleting listings, and the like.

In another aspect of the invention new listings for a user's profile, such as a new passthrough to a bank or other enterprise page, may be added semi-automatically as follows: Typically, when a user opens a new account with an enterprise through interaction with a WEB page hosted by the enterprise, the user is required to provide certain information, which will typically include such as the user's ID, address, e-mail account, and so forth, and typically a new user name and password to access the account. In this process the user will be interacting with the enterprise's page from his/her browser. A Password-All plug-in is provided wherein, after entering the required information for the new enterprise, the user may activate a pre-determined signal (right click, key stroke, etc.), and the Password-All suite will then enter a new passthrough in the user's Password-All profile at the Password-All Portal server.

In a related method for new entries, the enterprise hosting the Password-All Portal may, by agreement with other enterprises, provide log-in and sign-up services at the Password-All Portal, with most action transparent to the user. For example, there may be, at the Password-All Portal, a selectable browser list of cooperating enterprises, such as banks, security services, and the like, and a user having a Password-All Portal subscription and profile may select among such cooperating enterprises and open new accounts, which will simultaneously and automatically be added to the Password-All Portal page for the user and to the server hosted by the cooperating enterprise. There may be some interactivity required for different accounts, but in the main, much information from the user's profile may be used directly without being re-entered.

The inventors have anticipated that many potential users may well be suspicious of providing passwords and user names to an enterprise hosting a Password-All Portal Server executing a service like Password-All according to embodiments of the present invention. To accommodate this problem, in preferred embodiments, it is not necessary that the user provide the cleartext password to Password. All. Instead, an encrypted version of each password is provided. When a user links to his passthrough page in Password-All at the Password-All Portal server, when he/she invokes a hyperlink, the encrypted password is returned to the user's system, which then, by virtue of the kept encryption key or master password, invokes the true and necessary password for connection to the selected destination. It is thus not necessary that cleartext passwords be stored at the Password-All Portal server, where they may be vulnerable to attack from outside sources, or to perceived misuse in other ways as well.

In a related safety measure, in a preferred embodiment of the invention, a user's complete profile is never stored on a single server, but is distributed over two or more, preferably more, servers, so any problem with any one server will minimize the overall effect for any particular user.

Password-All, as described above, allows a user to access a complete list of the user's usual cyberspace destinations, complete with necessary log-on data, stored in an encrypted fashion, so a user may simply select a destination (a hyperlink) in the Password-All list, and the user's browser then invokes the URL for the selected destination. In an added feature, Password-All may display banner ads and other types of advertisement during the navigation time between a hyperlink being invoked and the time the destination WEB page is displayed.

In yet another embodiment of the invention, a user/subscriber need not access the Password-All page to enjoy the advantages of the unique features provided. In this variation, a Plug-In is provided for the subscriber's WEB browser. If the subscriber navigates by use of the local browser to a WEB page requiring a secure log-in, such as his/her on-line banking destination, when the subscriber is presented with an input window for ID and Password, the plug in may be activated by a predetermined user input, such as a hot key or right click of the mouse device. The plug-in then accesses, transparently, the Password-All page (which may be cached at the client), and automatically accesses and provides the needed data for log-on.

In yet another aspect of the invention a search option 37 allows a user to search list 34 for specific URL's based on typed input such as keywords or the like. In some cases, the number of URL's stored in list 34 can be extensive making a search function such as function 37 an attractive option. A criteria dialog box 51 illustrated as logically separated from and below list 34 is provided and adapted to accept input for search option 37 as is known in the art. In one embodiment, search option 37 may bring up a second window wherein a dialog box such as box 51 could be located.

In another aspect of the invention the search function may also be configured in a window invoked from window 33, and caused to search all or selected ones of listed destinations, and to return results in a manner that may be, at least to some extent, configured by a user. For example, a dialog box may be presented wherein a user may enter a search criteria, and select among all of the listed destinations. The search will then be access each of the selected destinations in turn, and the result may be presented to the user as each instance of the criteria is found, or results may be listed in a manner to be accessed after the search.

Preferably the search function is a part of the Password-All Portal software, available for all users, and may be accessed by hyperlinks in user's personal pages. In some embodiments users may create highly individualized search functions that may be stored in a manner to be usable only by the user who creates such a function.

In many aspects of the present invention, knowledge of specific WEB pages, and certain types of WEB pages, is highly desirable. In many embodiments characteristics of destination WEB pages are researched by persons (facilitators) maintaining and enhancing Password-All Portal software 35, and many characteristics may be provided in configuration modules for users to accomplish specific tasks. In most cases these characteristics are invoked and incorporated transparent to the user.

In yet another aspect of the present invention, the Password-All suite is structured to provide periodic reports to a user, in a manner to be structured and timed by the user, through the user's profile. For example, reports of changes in account balances in bank accounts, stock purchases, stock values, total airline travel purchases, frequent-flier miles, and the like may be summarized and provided to the users in many different ways. Because the Password-All Portal server with the Password-All software site handles a broad variety of transactional traffic for a user, there is an opportunity to summarize and collect and process statistics in many useful ways. In preferred embodiments of the invention such reports may be furnished and implemented in a number of different ways, including being displayed on the user's secure personal WEB page on the Password-All Portal.

In addition to the ability of performing tasks as described above, task results including reports, and hard documents such as airline tickets may be sent over the Internet or other data packet-networks to user-defined destinations such as fax machines, connected computer nodes, e-mail servers, and other Internet-connected appliances. All tasks may be set-up and caused to run according to user-defined schedules while the user is doing something else or is otherwise not engaged with the scheduled task.

In another embodiment of the present invention, recognizing the increasing use of the Internet for fiscal transactions, such as purchasing goods and services, a facility is provided in a user's profile to automatically track transactions made at various destinations, and to authorize payment either on a transaction-by-transaction basis, or after a session, using access to the user's bank accounts, all of which may be pre-programmed and authorized by the user.

Other functions or options illustrated as part of application 35 include a last URL option 41, an update function 43, and an add function 45. Function 41 allows a user to immediately navigate to a last visited URL. Update function 43 provides a means of updating URL's for content and new address. An add function enables a user to add additional URL's to list 34. Similarly, function 45 may also provide a means to delete entries. Other ways to add accounts are described above. It should be noted that the services provided by the unique Password-All Portal in embodiments of the present invention, and by the Password-All software suite are not limited to destinations requiring passwords and user names. The Password-All Portal and software in many embodiments may also be used to manage all of a user's bookmarks, including editing of bookmarks and the like. In this aspect, bookmarks will typically be presented in indexed, grouped, and hierarchical ways.

There are editing features provided with Password-All for adding, acquiring, deleting, and otherwise managing bookmarks. As a convenience, in many embodiments of the invention, bookmarks may be downloaded from a user's Password-All site, and loaded onto the same user's local browser. In this manner, additions and improvements in the bookmark set for a user may be used without the necessity of going to Password-All. Further, bookmarks may be uploaded from a user's local PC to his/her home page on the Password-All site by use of one or more Password-All plug-ins.

It will be apparent to the skilled artisan, given the teaching herein, that the functionality provided in various embodiments of the invention is especially applicable to Internet-capable appliances that may be limited in input capability. For example, a set-top box in a WEB TV application may well be without a keyboard for entering IDs and Passwords and the like. In practice of the present invention keyboard entry is minimized or eliminated. The same comments apply to many other sorts of Internet appliances.

In preferred embodiments of the invention, once a subscriber-user is in Password-All, only an ability to point-and-click is needed for all navigation. To get into the Password-All site, using a limited apparatus, such as an appliance without a keyboard or keypad, a Smartcard or embedded password may be used, or some other type of authentication.

It will be apparent to one with skill in the art that an interactive application such as application 33 may be provided in a form other than a WEB page without departing from the spirit and scope of the present invention. For example, an application such as application 33 may be provided as a downloadable module or program that may be set-up and configured off-line and made operational when on-line.

Figure 3:
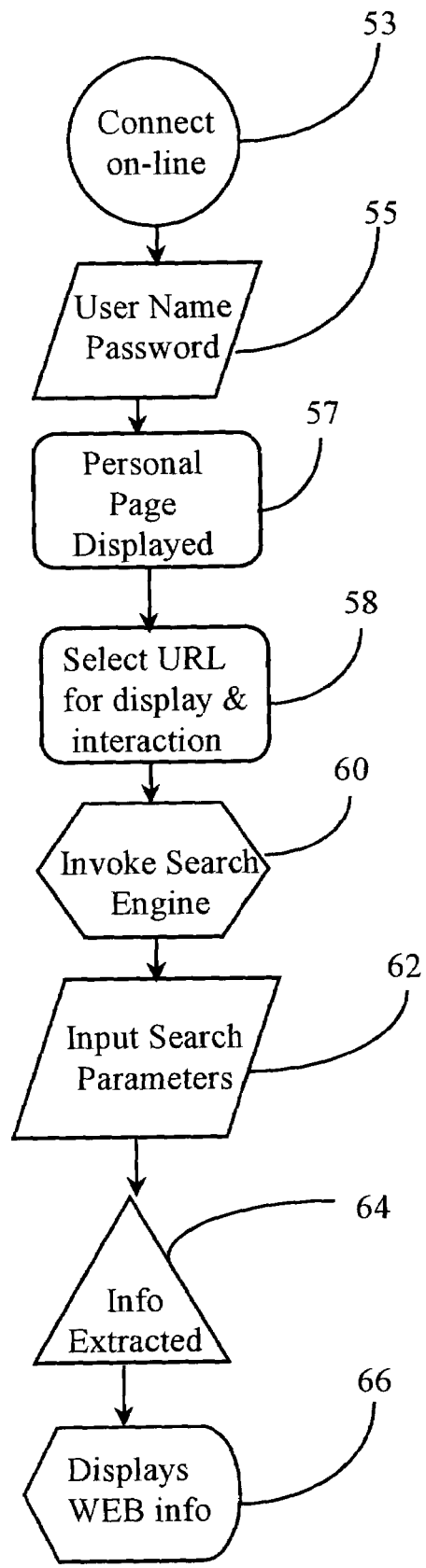
FIG. 3 is a flow diagram illustrating user interaction with the Internet portal of FIG. 1.

FIG. 3 is a flow diagram illustrating user interaction with the Internet Password-All Portal of FIG. 1. The following process steps illustrated, according to an embodiment of the present invention, are intended to illustrate exemplary user-steps and automated software processes that may be initiated and invoked during interaction with an Internet portal of the present invention such as portal 31 of FIG. 1. In step 53 a user connects to the Internet or another previously described switched-packet network via a compatible appliance such as Internet appliance 17 of FIG. 1.

At step 55, a user enters a user-name and password, which, in one embodiment, may simply be his ISP user name and password. In another embodiment, a second password or code would be required to access an Internet portal such as portal server 31 of FIG. 1 after logging onto the Internet through the ISP. In some cases, having a special arrangement with the ISP, there may be one password for both Internet access through the ISP and for Password-All. At step 57 a personal WEB page such as page 32 of FIG. 2 is displayed via Internet portal server 31. At minimum, the personalized WEB page will contain all user configured URL's, and may also be enhanced by a search function, among other possibilities.

In step 58 a user will, minimally, select a URL from his or her bookmarked destinations, and as is known by hyperlink technology, the transparent URL will be invoked, and the user will navigate to that destination for the purpose of normal user interaction. In this action, the Password-All Portal software transparently logs the user on to the destination page, if such log-on is needed.

At step 60 the user invokes a search engine by clicking on an option such as described option 37 of FIG. 2. At step 62, the user inputs search parameters into a provided text field such as text field 51 of FIG. 2. After inputting such parameters, the user starts the search by a button such as button 52. The search engine extracts information in step 64. Such information may be, in one option, of the form of URL's fitting the description provided by search parameters. A searched list of URL's may be presented in a separate generated page in step 66 after which a user may select which URL to navigate to. In an optional search function, the user may provide search criteria, and search any or all of the possible destinations for the criteria.

In another embodiment wherein WEB pages are cached in their presentable form, information extracted in step 64 may include any information contained in any of the stored pages such as text, pictures, interactive content, or the like. In this case, one displayed result page may provide generated links to search results that include the URL associated with the results. Perhaps by clicking on a text or graphic result, the associated WEB page will be displayed for the user with the result highlighted and in view with regards to the display window.

Enhanced Agent for WEB Summaries

In another aspect of the present invention, a software agent, termed a gatherer by the inventors, is adapted to gather and return summary information about URL's according to user request or enterprise discretion. This is accomplished in embodiments of the present invention by a unique scripting and language parsing method provided by the inventor wherein human knowledge workers associated with the service provide written scripts to such a gatherer according to subscriber or enterprise directives. Such a software gatherer, and capabilities thereof, is described in enabling detail below.

Referring now to FIG. 1, there is illustrated an exemplary architecture representing a portal service-network which, in this case is hosted by ISP 15. Portal software 35 in this embodiment executes on portal server 31 set-up at the ISP location. Mass repository 29 is used for storing subscriber information such as passwords, login names, and the like. Internet servers 23, 25, and 27 represent servers that are adapted to serve WEB pages of enterprises patronized by a subscriber to the portal service such as one operating Internet appliance 17.

The main purpose of portal software 35 as described above with reference to FIG. 2, is to provide an interactive application that lists all of the subscriber's WEB sites in the form of hyperlinks. When a user invokes a hyperlink from his personal list, software 35 uses the subscriber's personal information to provide an automatic and transparent login function for the subscriber while jumping the subscriber to the subject destination.

Referring again to FIG. 2, an interactive list 34 containing user-entered hyperlinks and a set of interactive tools is displayed to a subscriber by portal software 35 of FIG. 1.

One of the tools available to a subscriber interacting with list 34 is agent (software) 39. Agent 39 may be programmed to perform certain tasks such as obtaining account information, executing simple transactions, returning user-requested notification information about upcoming events, and so on. Search function 37 and update function 43 may be integrated with agent 39 as required to aid in functionality.

It is described in the above disclosure that agent 39 may, in some embodiments, search for and return certain summary information contained on user-subscribed WEB pages, such as account summaries, order tracking information and certain other information according to user-defined parameters. This feature may be programmed by a user to work on a periodic time schedule, or on demand.

In the following disclosure, enhancements are provided to agent 39. Such enhancements, described in detail below, may be integrated into agent 39 of portal software 35 (FIGS. 1 and 2); and may be provided as a separate agent or gatherer to run with portal software 35; or may, in some embodiments, be provided as a standalone service that is separate from portal software 35.

Figure 4:
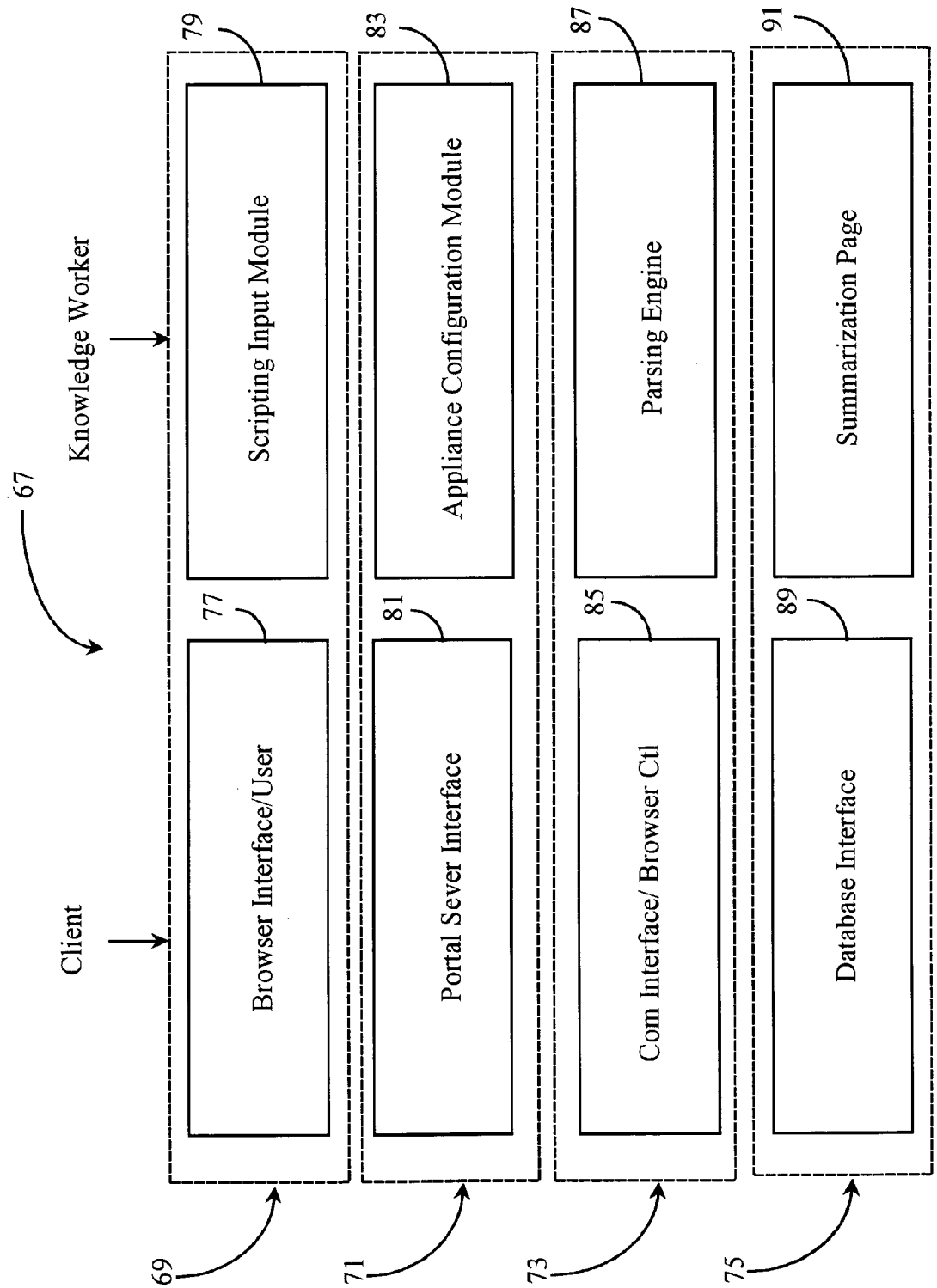
FIG. 4 is a block diagram illustrating a summarization software agent and capabilities thereof according to an embodiment of the present invention.

FIG. 4 is a block diagram illustrating a summarization software agent 67 and various capabilities and layers thereof according to an embodiment of the present invention. Summarization agent 67, hereinafter termed gatherer 67, is a programmable and interactive software application adapted to run on a network server. Gatherer 67 may, in one embodiment, be integrated with portal software 35 of FIG. 1 and be provided in the form of a software module separate from agent 39 (FIG. 2). In another embodiment, gatherer 67 may be a part of agent 39 as an enhancement to the function of that agent as previously described. In still another embodiment, gatherer 67 may be provided as a parent or client-side application controlled by a separate service from the portal service described above.

In this exemplary embodiment gatherer 67 is a multi-featured software application having a variety of sub-modules and interface modules incorporated therein to provide enhanced function. Gatherer 67 has a client/service interface layer 69 adapted to enable directive input from both a client (user) and a knowledge worker or workers associated with the service. A browser interface 77 is provided in layer 69, and adapted to provide access to application 67 from a browser running on a client's PC or other Internet or network appliance. Interface 77 facilitates bi-directional communication with a user's browser application (not shown) for the purpose of allowing the user to input summary requests into gatherer 67 and receive summary results. Interface 77 supports all existing network communication protocols such as may be known in the art, and may be adapted to support future protocols.

Layer 69 also comprises a unique input scripting module 79 that is adapted to allow a human knowledge worker to create and supply directive scripts containing the site logic needed by gatherer 67 to find and retrieve data from a WEB site. In this case, gatherer 67 executes and runs on a network server such as server 31 of FIG. 1. However, this is not required in order to practice the present invention.

It is assumed in this example that gatherer 67 is part of the portal software suite 35 running on server 31 of FIG. 1. Gatherer 67 may be provided as several dedicated agents, or as one multi-functional agent without departing from the spirit and scope of the present invention. For example, one gatherer 67 may be scripted and programmed to execute a single user request with additional gatherers 67 called upon to perform additional user-requests. Alternatively, one gatherer 67 may be dedicated and assigned to each individual user and adapted to handle all requests from that user.

Interface layer 69 facilitates exchange of information from both a client and a knowledge worker. A client operating a WEB browser with an appropriate plug-in is enabled to communicate and interact with gatherer 67. For example, a user may enter a request to return a summary of pricing for all apartments renting for under $1000.00 per month located in a given area (defined by the user) from apartments.com (one of user's registered WEB sites). The just mentioned request would be categorized as either a periodic request, or a one time (on demand) request. The communicated request initiates a service action wherein a knowledge worker associated with the service uses module 79 to set-up gatherer 67 to perform it's function. Module 79 is typically executed from a network-connected PC operated by the knowledge worker.

According to an embodiment of the present invention, a unique scripting method facilitated by module 79 is provided to enable gatherer 67 to obtain the goal information requested by a user. For example, the above mentioned example of WEB-site apartments.com has a specific HTML (hyper-text-markup-language) logic that it uses to create its site and post its information. Such site logic is relatively standard fare for a majority of different sites hosted by different entities. Using this knowledge, a knowledge worker creates a site-specific script or template for gatherer 67 to follow. Such a template contains descriptions and locations of the appropriate fields used, for example, at apartments.com. Apartment description, location, deposit information, rental information, agent contact information, and other related fields are matched in terms of location and label description on the template created with module 79. Completed templates are stored in a database contained in a storage facility such as, perhaps, repository 29 of FIG. 1. Such templates may be reused and may be updated (edited) with new data.

In one embodiment, one script may contain site logics for a plurality of WEB pages, and instructions for specific navigational instruction and password or login information may be contained therein and executed serially, such as one site at a time. It is important to note that the knowledge worker or workers may perform much of their scripting via automatic controls such as by object linking and embedding (OLE) and a minor portion of scripting may be performed manually in an appropriate computer language, many of which are known in the art).

Gatherer 67 also has a process layer 71 adapted for internal information gathering and parameter configuration. An optional portal server interface 81 is provided and adapted to allow gather 67 to provide updated information to a user's list of hyperlinks and also to obtain data from portal server 31 if required. For example, required hyperlinks may be mirrored from a user's home page to a scripting template for navigational purposes. In an embodiment wherein gatherer 67 is part of a standalone service, a convention for providing user login information may be supplied at the client's end when a request is made. For example, an encrypted password may be supplied by a client plug-in and gatherer 67 may temporarily borrow the user's encryption key when auto login is performed.

An appliance configuration module 83 is provided and adapted to allow a user to define and configure an Internet appliance to communicate with the service and receive summary information. Such appliances may include but are not limited to palm top PC's, lap top PC's, cellular telephones, WEB TV's, and so on. Typically, a user will be presented a configuration WEB page from a network server that displays in his browser window on his desktop PC. The page contains an interface for communicating device parameters and communication protocol types to module 83. In this way, a user may configure a preferred device for receipt of summary information. Device parameters and communication protocols inherent to such a device are incorporated into the scripting of the site template and are used as instructions for WEB summary delivery.

A navigation layer 73 is provided and adapted to perform the function of external site navigation and data gathering for gatherer 67. To this end, a communication interface/browser control module 85 is provided and adapted to function as a WEB browser to access WEB sites containing WEB data. Control 85 receives it's instruction from the scripted template created by the knowledge worker.

A parsing engine 87 is provided and adapted to parse individual WEB sites according to a template created via scripting module 79. Parsing engine 87 may be a Pearl engine, an IE HTML engine, or any other or combination of known parsing engines. The template (not shown) tells control 85 and parsing engine 87 where to go and what fields at the destination site to look for to access desired data. Once the data fields are located, parsing engine 87 gathers current data in the appropriate field, and returns that data to the service for further processing such as data conversion, compression and storage, and the like.

Because WEB sites use tools that use consistent logic in setting up their sites, this logic may be used by the summarization service to instruct control 83 and parsing engine 87. The inventor provides herein an exemplary script logic for navigating to and garnishing data from amazon™.com. The hyperlinks and/or actual URLs required for navigation are not shown, but may be assumed to be included in the template script. In this example, a company name Yodlee (known to the inventors) is used in the script for naming object holders and object containers, which are in this case Active X™ conventions. In another embodiment, Java™ script or another object linking control may be used. The scripted template logic example is as follows:

Site amazon.orders.x—shows status of orders from Amazon

```
login( 7 );
get( "/exec/obidos/order-list/" );
my @tables = get_tables_containing_text( "Orders:" );
my $order_list = new Yodlee::ObjectHolder( 'orders' );
$order_list->source( 'amazon' );
$order_list->link_info( get_link_info( ) );
my @href_list;
my @container_list;
foreach my $table ( @tables ) {
    my @rows = get_table_rows( );
    foreach my $i ( 0 . . . $#rows ) {
        select_row( $i );
        my $text = get_text( $rows[ $i ] );
        next if $text =~ /Orders:|Status/;
        my @items = get_row_items( );
        next unless @items >= 4;
        my( $order_num, $date, $status );
        select_cell( 1 );
        $order_num = get_cell_text( );
        my $href = get_url_of_first_href( get_cell( ) );
        select_cell( 2 );
        $date = get_cell_text( );
        select_cell( 3 );
        $status = get_cell_text( );
        next unless defined $order_num and defined $date and defined
```

-continued

```
$status;
        my $order = new Yodlee::Container( 'orders' );
        $order->order_number( $order_num );
        $order->date( $date );
        $order->status( $status );
        $order_list->push_object( $order );
        if( defined $href ) {
            push( @href_list, $href );
            push( @container_list, $order );
        }
foreach my $i ( 0 . . . $#href_list ) {
    get( $href_list[ $i ] );
    @tables = get_tables_containing_text( "Items Ordered:" );
foreach my $table ( @tables ) {
    my @rows = get_table_rows( );
    foreach my $j ( 0 . . . $#rows ) {
        select_row( $j );
        my $href = get_url_of_first_href( get_row( ) );
        next unless defined $href;
        my @child_list = get_children( get_row( ), 'a' );
        next unless defined $child_list[ 0 ];
        my $text = get_text( $child_list[ 0 ]);
        $container_list[ $i ]->description( $text );
    }
  }
}
result( $order_list );
```

The above example is a script that instructs control 85 and parser 87 to navigate to and obtain data from Amazonm™.com, specifically that data that reflects the user's current order status. Scripts may also be written to obtain virtually any type of text information available from any site. For example, a user may wish to obtain the New York Times headlines, the top ten performing stocks, a comparative list of flights from San Francisco to New York, etc. In one embodiment, metadata may be associated with and used in-place of the actual scripted language for the purpose of reducing complication in the case of many scripts on one template.

A data processing layer 75 is provided and adapted to store, process, and present returned data to users according to enterprise rules and client direction. A database interface module 89 is provided and adapted to provide access for gatherer 67 to a mass repository such as repository 29 of FIG. 1, for the purpose of storing and retrieving summary data, templates, it presentation directives, and so on. Gatherer agent 67 may also access data through interface 89 such as profile information, user account and URL information, stored site logics and so on. Data scanned from the WEB is stored in a canonical format in a database such as repository 29, or in another connected storage facility. All stored data is, of course, associated with an individual who requested it, or for whom the data is made available according to enterprise discretion.

A summarization page module 91 is provided and adapted to organize and serve a WEB summary page to a user. Module 91, in some embodiments, may immediately push a WEB summary to a user, or module 91 may store such summarized pages for a user to access via a pull method, in which case a notification may be sent to the user alerting him of the summary page availability. Summarization module 91 includes an HTML renderer that is able to format data into HTML format for WEB page display. In this way, e-mail messages and the like may be presented as HTML text on a user's summarization page. Moreover, any summary data from any site may include an embedded hyperlink to that site. In this way, a user looking at an e-mail text in HTML may click on it and launch the appropriate e-mail program. Other sites will, by default, be linked through, the summary page.

Many users will access their summary data through a WEB page as described above, however, this is not required in order to practice the present invention. In some embodiments, users will want their summary information formatted and delivered to one of a variety of Internet-capable appliances such as a palm top or, perhaps a cell phone. To this end, the renderer is capable of formatting and presenting the summary data into a number of formats specific to alternative devices. Examples of different known formats include, but are not limited to XML, plain text, VoxML, HDML, audio, video, and so on.

In a preferred embodiment of the present invention, gather 67 is flexible in such a way as it may act according to enterprise rules, client directives, or a combination of the two. For example, if a user makes a request for summary data about a user/subscribed WEB page to be periodically executed and presented in the form of a HTML document, then gather 67 would automatically access and analyze the required internal information and user provided information to formulate a directive. Using scripting module 79, a knowledge worker provides a template (if one is not already created for that site) that contains the "where to go" and "what to get" information according to site logic, user input, and known information.

Alternatively, if a user requests a summary about data on one of his sites such as, perhaps, current interest rates and re-finance costs at his mortgage site, the service may at it's own discretion provide an additional unsolicited summary from an alternate mortgage site for comparison. This type of summarization would be designed to enhance a user's position based on his profile information. In this case, updated data about latest interest rates, stock performances, car prices, airline ticket discounts, and so on would be stored by the service for comparative purposes. If a user request for a summary can be equaled or bettered in terms of any advantage to the user, such summary data may be included.

In many cases, created templates may be re-used unless a WEB site changes it's site logic parameters, in which case, the new logic must be accessed and any existing templates must be updated, or a new template may be created for the site. The templates contain site-specific script obtained from the site and stored by the knowledge workers. In one embodiment, companies hosting WEB pages automatically provide their site logics and any logic updates to the service by virtue of an agreement between the service and the WEB hosts.

In an alternative embodiment gatherer 67 may be implemented as a client application installed on a user's PC. In this embodiment, a user would not be required to supply log-in or password codes. Summarization scripts may be sent to the client software and templates may be automatically created with the appropriate scripts using log-in and password information encrypted and stored locally on the user's machine.

In addition to providing WEB summary information, gatherer 67 may also be used to provide such as automatic registration to new sites, and for updating old registration information to existing sites. For example, if a user whishes to subscribe, or register at a new site, only the identification of the site is required from the user as long as his pertinent information has not changed. If a new password or the like is required, gatherer 67 through control module 73 may present login or password codes from a list of alternative codes provided by a user. In another embodiment, a database (not shown) containing a wealth of password options may be accessed by gatherer 67 for the purpose of trying different passwords until one is accepted by the site. Once a password or log-in code is accepted, it may be sent to a user and stored in his password list and at the network level.

It will be apparent to one with skill in the art that a software application such as gatherer 67 may be implemented in many separate locations connected in a data network. For example, a plurality of gatherer applications may be distributed over many separate servers linked to one or more mass repositories. Client applications include but are not limited to a WEB-browser plug-in for communicating to the service. Plug-in extensions may also be afforded to proxy servers so that auto-login and data access may still be performed transparent to a user.

In another embodiment, plug-ins enabling communication with gatherer 67 may be provided and configured to run on other network devices for the purpose of enabling such a device to initiate a request and get a response without the need for a desktop computer.

In most embodiments a user operating a desktop PC will order a one time or periodic summary related to some or all of his subscribed WEB sites. A logical flow of an exemplary request/response interaction is provided below.

Figure 5:
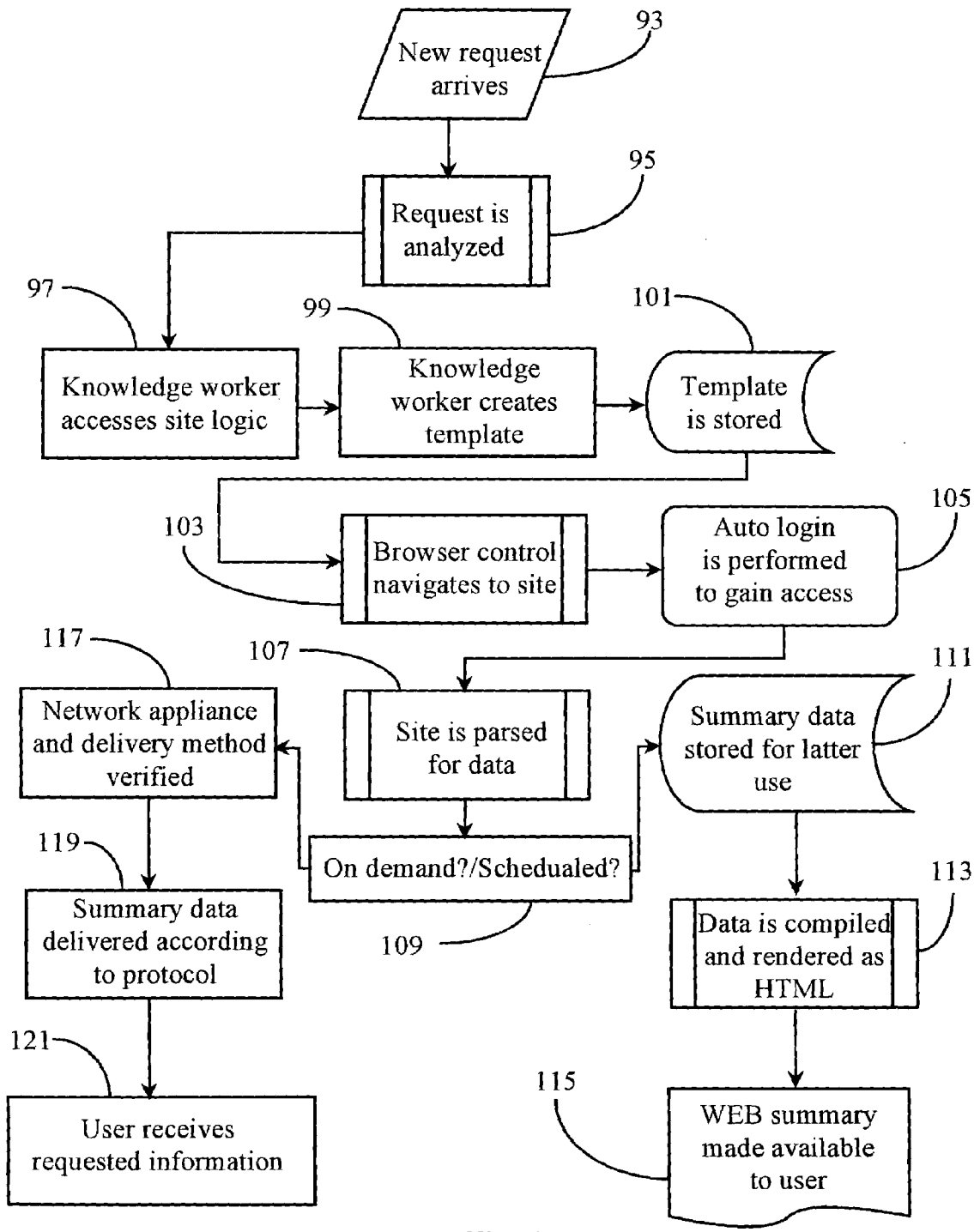
FIG. 5 is a logical flow chart illustrating an exemplary summarization process performed by the software agent of FIG. 4 operating in a user-defined mode.

FIG. 5 is a logical flow chart illustrating an exemplary summarization process performed by the software agent of FIG. 4 operating in a user-defined mode. In step 93, a user has initiated a new request for a summary (summary order). It is assumed for the purpose of discussion, that the request of step 93 involves a site wherein no template has been created. In step 95, the request is received and analyzed. A knowledge worker will likely perform this step. The new request may be posted to the user's portal home page, sent directly to gatherer 67, or even communicated through e-mail or other media to the service.

In step 97 a knowledge worker accesses particular site logic associated with the request URLs. For example, if the request involves a plurality of URLs, then all site logics for those URLs are accessed. Logic may be available in a repository such as repository 29 of FIG. 1 if they were obtained at the time of user registration to a particular URL, or sent in by WEB-site hosts shortly after registration. If it is a completely new URL, then the logic must be obtained from the site. In most cases however, the logic will be known by virtue of a plurality of users accessing common URLs. Therefore cross-linking in a database of logic/user associations may be performed to access a logic for a site that is new to one particular user, but not new to another.

In step 99, the knowledge worker creates a template by virtue of scripting module 79 (FIG. 4) containing all site logic, URLs, log-in and password information, and the user request information. As described previously, templates may be re-used for a same request. In most cases, scripting may be mostly automated with minimum manual input performed by the knowledge worker. In many cases, an existing template will match a new request exactly, and may be re-used. In that case steps 97, 99, and 101 would not be required.

In step 101 the template is stored and associated with the requesting user. The stored template may now be retrieved at a scheduled time for performing the summary gathering. At step 103, a browser control such as module 85 of FIG. 4 is activated to access the stored template and navigate to specified URLs for the purpose of gathering summary data. If a timing function is attributed to the template stored in step 101, then the template may self execute and call up the browser function. In another embodiment, the knowledge worker may notify the browser control to get the template for it's next task. In some embodiments, a plurality of controls may be used with one template as previously described.

In step 105, automatic log-in is performed, if required, to gain access to each specified URL. In step 107, a specified WEB-page is navigated to and parsed for requested data according to the logic on the template. If there are a plurality of WEB-pages to parse, then this step is repeated for the number of pages. A variety of parsing engines may be used for this process such as an IE™ parser, or a Pearl™ parser. Only the requested data is kept in step 107.

A request may be an on-demand request requiring immediate return, or a scheduled request wherein data may be posted. At step 109, such logic is confirmed. If the data is to be presented according to a periodic schedule, then summary data parsed in step 107 is stored for latter use in step 111. In step 113, the summary data is rendered as HTML if not already formatted, and displayed in the form of a summary WEB-page in step 1115. The summary page may be posted for access by a user at a time convenient to the user (pull), or may be pushed as a WEB-page to the user and be made to automatically display on the user's PC. Notification of summary page availability may also be sent to a user to alert him of completion of order.

If the summary data is from a one-time on-demand request and required immediately by a user, then a network appliance and data delivery method (configured by the user) is confirmed, and the data is rendered in the appropriate format for delivery and display in step 117. In step 119, the summary data is delivered according to protocol to a user's designated appliance. In step 121 a user receives requested information in the appropriate format.

It will be apparent to one with skill in the art that there may be more or fewer logical steps as well as added sub-steps than are illustrated in this example. For example, step 105 may in other embodiments include sub-steps such as getting an encryption key from a user. In still another embodiment, part of a request may be rendered as HTML as in step 113 while certain other portions of the same request data might be rendered in another format and delivered via alternative methods. There are many possibilities.

The method and apparatus of the present invention may be used to present summaries to users without user input. Process logic such as this is detailed below.

Figure 6:
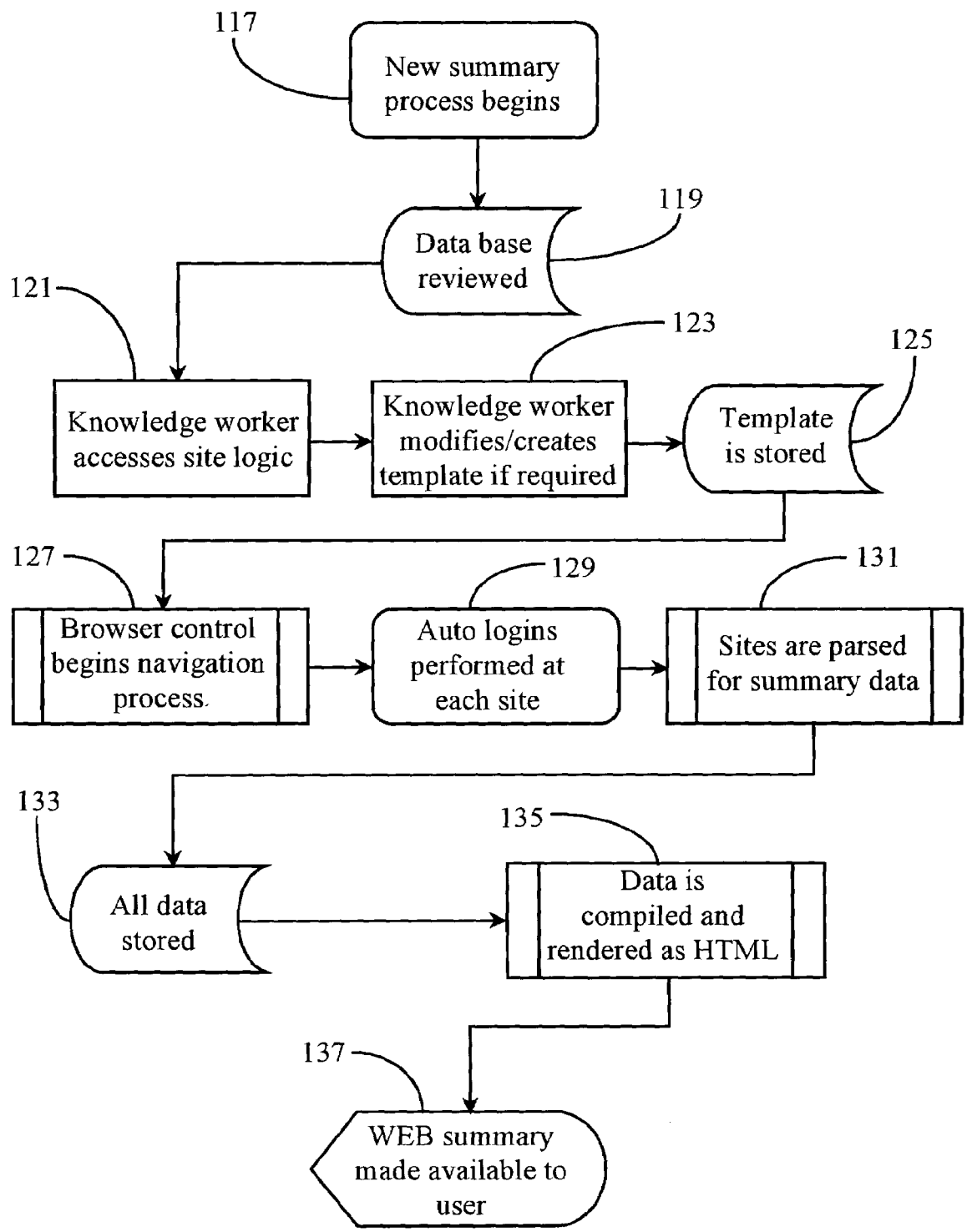
FIG. 6 is a logical flow chart illustrating an exemplary summarization process performed by the software agent of FIG. 4 in a User-independent smart mode with minimum user input.

FIG. 6 is a logical flow chart illustrating an exemplary summarization process performed by the software agent of FIG. 4 in a User-independent smart mode with minimum or no user input. In step 117 an enterprise-initiated summary process begins. In this case, the enterprise may be assisting a user in finding a better deal or, perhaps presenting the individual with summaries from and links to alternative pages not yet subscribed to by a user.

In step 119, a database containing user information and parameters is accessed and reviewed. Certain information specific to a user may be required to initiate an enterprise-sponsored summary report. At step 121, the knowledge worker accesses the site logic specific to the specified target site or sites for summarization. In step 123, the knowledge worker modifies an existing user template, or creates a new one if necessary. At step 125 the template is stored in a repository such as repository 29 and associated with the user.

As described in FIG. 5, the template either self-executes according to a timed function and invokes a browser control such as control 85 (FIG. 4), or is accessed by control 85 as a result of task notification. In step 127, the browser control begins navigation. Auto logins are performed, if required, in step 129 to gain access to selected sites. If the WEB pages are new to a user, and the user has no registration with the WEB site, then through agreement, or other convention, the service may be provided access to such sites. Such an agreement may be made, for example, if the host of the WEB site realizes a possibility of gaining a new customer if the customer likes the summary information presented. In many other situations, no password or login information is required to obtain general information that is not personal to a client.

In step 131, all sites are parsed for summary data and stored in canonical fashion in step 133. At step 135, the data is compiled and rendered as HTML for presentation on a summary page. In step 137, a WEB summary containing all of the data is made available to a user and the user is notified of it's existence.

Providing certain information not requested by a user may aid in enhancing a user's organization of is current business on the WEB. Moreover, unsolicited WEB summaries may provide better opportunities than the current options in the user's profile. Of course, assisting a user in this manner will require that the enterprise (service) have access to the user's profile and existing account and service information with various WEB sites on the user's list. A user may forbid use of a user's personal information, in which case, no enterprise-initiated summaries would be performed unless they are conducted strictly in an offer mode instead of a comparative mode.

The method and apparatus also may be practiced in a language and platform independent manner, and be implemented over a variety of scalable server architectures.

Active Bookmark

According to one aspect of the present invention, a novel, network-based method for managing user-selected bookmarks is provided. Active book-marking, as termed by the inventor, involves selecting URLs during Web browsing and adding them to a favorites list managed on the World Wide Web. Part of the management system includes providing Web summaries on a periodic basis for subscribed users. The present invention including various aspects thereof is described in enabling detail below.

Figure 7:
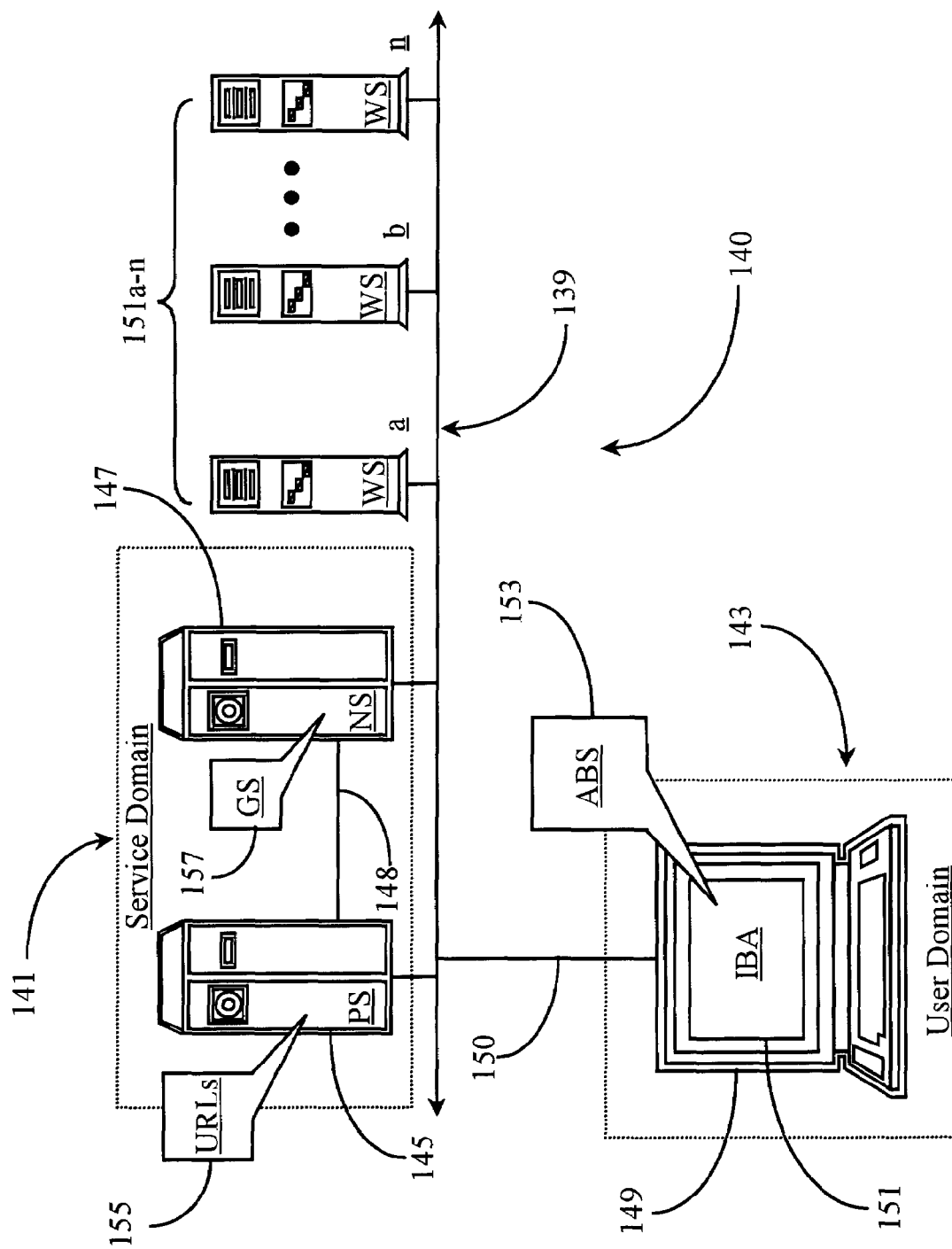
FIG. 7 is a block diagram illustrating function of a bookmark management and WEB-summary system according to an embodiment of the present invention.

FIG. 7 is a block diagram illustrating function of a bookmark-management and WEB-summary system 140 according to an embodiment of the present invention. System 140 comprises an Internet backbone 139, a service domain 141, and an exemplary user domain 143. Internet backbone 139 represents all the lines and connection points making up the Internet as a whole, including sub-networks. Equipment illustrated as connected to Internet backbone 139 may be assumed to be equipment associated within the Internet network as a whole. In this sense, there are no geographic limitations to the scope of the present invention.

Service domain 141, illustrated within a dotted rectangle, represents an Internet-portal service as described in documents Ser. No. 09/323,598 and Ser. No. 09/208,740 listed in the cross-reference section of the specification. Service domain 141 provides Internet portal services and Web-summary services to users, typically subscribers to the portal service. In this example, domain 141 is hosted on the Internet, or more specifically, on backbone 139. In another embodiment, domain 141 may exist within an ISP analogous to ISP 15 of FIG. 1 described above.

Within service domain 141 there are two servers illustrated, servers 145 and 147. Server 145 is a portal server (PS) adapted to provide portal services to subscribing users as described in the cross-referenced patent applications listed under the cross reference section. Server 147 is adapted as a navigation server (NS) for proxy browsing and data gathering on behalf of subscribing users. Both PS 145 and NS 147 are connected to Internet backbone 139. In one embodiment of the present invention, the functions of both servers 145 and 147 may be provided within one more powerful server. The inventor chooses to separate function for illustrative purpose only. In this example, servers 145 and 147 are additionally connected by way of a dedicated data link 148. Data link 148 is adapted to allow faster communication between the two servers than may be available by the Internet connection between the two. In another embodiment server 145 and server 147 may communicate with each other over Internet backbone 139.

Also connected to backbone 139 are Web servers (WS) 151 *a–n*. Web servers 151*a–n* are adapted as Internet file servers as are known in the art. For example, Web server 151*a* may be a news server, Web server 151*b* may be a sports server, and Web server 151*n* may be an entertainment server. Servers 151*a–n* serve electronic information pages, also known in the art as Web pages, to users connected to them during Internet navigation. Each Web page has a universal resource locator (URL) associated with it that identifies an addressed location of that page within any of WEB servers 151*a–n*.

A user domain illustrated herein within a dotted rectangle labeled with the element number 143 represents a user subscribing to portal services offered through domain 141. User domain 143, hereinafter termed user 143, operates a PC 149 running an Internet browser application (IBA) 151, to browse Internet 139 over an Internet connection line 150. Internet connection 150 may be a dial-up connection, a wireless connection, or any other known Internet connection. An Internet service provider (ISP) is not illustrated in this example, but may be assumed to be present. PC 149 may be any type of Internet appliance capable of Internet navigation.

An instance of gathering software (GS) 157 is provided to run on navigation server 147. Software 157 is adapted to navigate to each URL present on a list of URLs stored in server 145 for the purpose of obtaining summary information from each URL and presenting such information in the form of an HTML document that may be presented in the form of an electronic display to a user operating PC 149. This function is generally described in application Ser. No. 09/323,598 listed under the cross-reference section.

In an embodiment of the present invention the inventor provides a novel application termed active browser software (ABS) 153, illustrated herein, as a plug-In to IBA 151. ABS 153 is adapted as a client-side book-marking software. An enhancement over prior art applications includes a capability of sending selected URLs over Internet connection 150 to portal server 145 for network-based management. ABS 153 is, in a preferred embodiment, a Java-based application. However, other known programming languages may be used to implement ABS 153. ABS 153 may be a standalone book-marking application, or it may be integrated with a standard book-marking application provided in most Web-browser applications.

A server-side software component, illustrated herein as software component 155, is provided to run on PS 145. Software 155 is adapted to manage URLs received from ABS 153 over Internet connection 150 during normal Internet navigation and selection of the URLs by user 143. Software 155 is integrated with GS 157 such that at periodic intervals, a navigation command is sent to GS 157 for the purpose of proxy navigation and data gathering from Web pages associated with each URL held in a list of URLs enabled by software 155. Listed URL's are links, often referred to in the art as shortcuts, to WEB pages associated with them and identified by them.

In practice of the present invention, user 143, operating PC 149, connects to portal server 145 by way of Internet connection line 150 and begins browsing the Internet. Web servers 151 *a–n* represent servers containing Web pages accessed by user 143 operating PC 149 as previously described. When a Web page is accessed and presented in BA 151, a user may invoke ABS 153 for the purpose of capturing the URL associated with that Web page. Once captured, the URL it is automatically sent over connection line 150 to portal server 145 where it is added to a list of URLs managed by software 155. At periodic intervals, to be determined by a user, software 155 generates a navigation command, which is sent over data link 148 to GS 157 in NS 147.

GS 157 may navigate to all of, or a portion of, the Web pages associated with each URL listed in software 155. Summary data includes any new updates to each of the Web pages associated with URLs listed by software 155. In this example, automatic log-in and second-level data searching services are not performed. Those services are performed with respect to URLs that are pre-configured for specific data summary searches as described in application Ser. No. 09/323,598.

It is presumed in this example that user 143, during the course of normal Internet navigation through servers 151 *a–n*, will select desired Web pages once they are presented in BA 151 for addition to the URL list stored in portal server 145. The specific class of Web pages a user will select to add, are Web pages wherein no log-ins or passwords are required. After user 143 has selected URLs and they are entered into a list at PS 145, the Web pages associated with those URLs are automatically browsed and parsed for data by GS 157 at periodic intervals to be determined by user 143. For example, if WS 151*a* contains a Web page that is a news page, periodic updates of the latest headlines may be provided on behalf of user 143. More detail about ABS 153 and software 155 is provided below.

Figure 8:
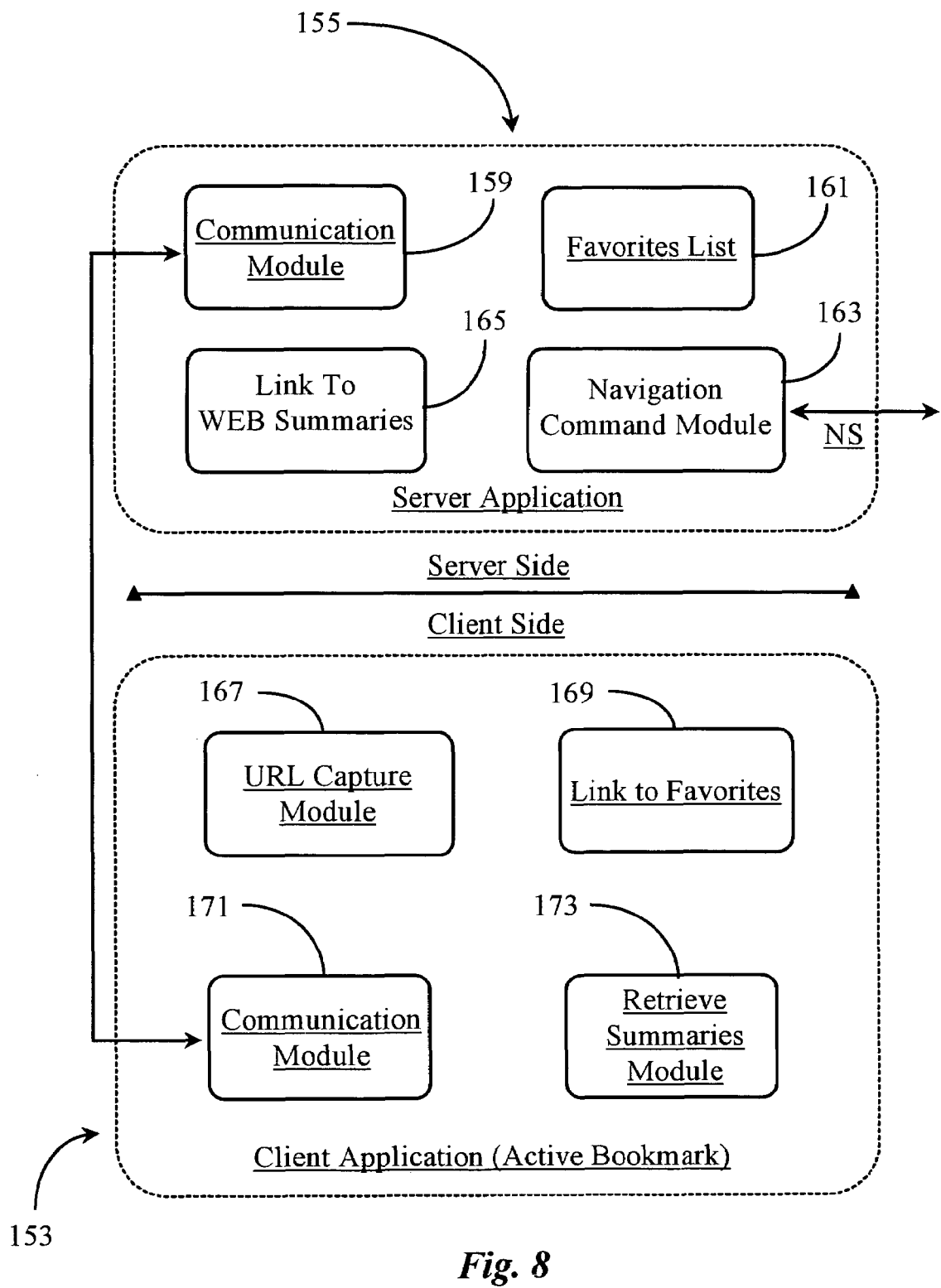
FIG. 8 is a block diagram illustrating components and function of an active bookmark application according to an embodiment of the present invention.

FIG. 8 is a block diagram illustrating components and function of ABS 153 and software 155 according to an embodiment of the present invention. As described in FIG. 7 above, ABS 153 is a client application adapted to reside within an Internet browser application analogous to IBA 151 of FIG. 7. It was also described in FIG. 7 above, that software 155 is a server-side application for network management of bookmarks sent thereto by ABS 153. This division is illustrated herein by a dividing double-arrow labeled server-side above the arrow and client-side below the arrow. Therefore, it will be apparent by one with skill in the art that both applications cooperate with each other to achieve the goal of the present invention, which is to manage URLs and to periodically navigate to and obtain summary data from the Web pages associated with listed URLs for eventual presentation to users.

Referring now to FIG. 8, server application 155 has a communication module 159 provided therein and adapted for communication with a like communication module 171 provided within client application 153. Bi-directional data communication capability between module 159, within application 155, and module 171, within application 153, is illustrated by a double-bracketed arrow connecting the two modules.

A URL capture module 167 is provided within client application 153 and is adapted to capture URL information during presentation of any visited Web page during normal Internet navigation. In an embodiment wherein client application 153 is a standalone application from a standard book-marking utility, invocation of module 167 causes a captured URL to be automatically sent to server application 155 through communication modules 171, in client application 153, and 159 in server application 155.

In an alternate embodiment, invocation of module 167 causes a captured URL to be sent to server application 155 and to a list of bookmarks stored at the client location. A link to favorites module 169 is provided within client application 153 and adapted to display, upon invocation of a user, the listed bookmarks stored either at server side, client side, or both, depending on the embodiment. In an embodiment wherein application 153 is integrated with a standard book-marking utility, there may be an option (not shown) associated with module 167 that allows a user to decide if a selected URL will be sent to server application 155 and to internal cache on a client machine, or to either of the above. In this way, an integrated utility may be provided that offers client-side book-marking as well as network-based book-marking and summary gathering.

A favorite list 161 is provided within server application 155 and adapted to store URLs sent thereto by a user operating client application 153. Some or all of the URLs contained in list 161 may be subject to periodic proxy navigation and data gathering performed on behalf of a user operating application 153. Upon invocation of module 169 all of the URLs contained in list 161 may be viewed. In one embodiment, a provision (not shown) may be provided that allows a user to manually delete URLs from, or to manually add URLs to list 161. There are many possibilities.

A retrieve summaries module 173 is provided within application 153 and adapted to allow a user to retrieve the latest summary data associated with URLs stored in list 161. By invoking module 173, a user may receive an HTML document in the form of a Web page that lists all of the URLs stored in list 161 and their associated summaries. A link to Web summaries module 165 is provided within server application 155 and adapted to allow all the summaries associated with the URLs and list 161 to be presented to a user upon invocation of module 173. In one embodiment, a user invoking module 173 may first receive an HTML display of URLs held in list 161 where upon selecting a portion of the URLs causes only the summaries associated with the selected URLs to be displayed.

A navigation command module 163 is provided within server application 155 and adapted to communicate with navigation server 147 of FIG. 1 as illustrated by a double arrow labeled NS. At periodic intervals, module 163 will request navigation services from GS 157 within NS 147 of FIG. 7. GS 157, upon granting of a request from module 163 will obtain all of the URLs included in the request and navigate to each URL and obtain the most recent data associated with each URL. In many cases, Web pages will already have summary information presented in HTML format. In these instances, no summarization is required. The data is simply transferred back to domain 141 and stored on behalf of subscribing users. In many cases, detailed information from Web pages will be summarized before presentation to users.

It will be apparent to one with skill in the art that applications 155 and 153 may contain more or fewer modules that are illustrated in this example without departing from the spirit and scope of the present invention. For example, a module may be added to application 153 that allows a user to categorize and organize URLs such that they may be stored in specific categories within list 161 as well as on a user's Internet appliance. Furthermore, a module may be added to server application 155 that allows a user to instantly navigate to any of the URLs listed in list 161. All of the modules illustrated in both server application 155 and in client application 153 may be accessed through traditional drop-down menus as are known in the art. The inventor intends that this example illustrate just one possible configuration of client application 153 and server application 155. As previously described, application 153 may be a standalone application provided within an Internet browser, or it may be integrated with a standard book-marking utility located within an Internet browser. There are many possibilities.

Figure 9:
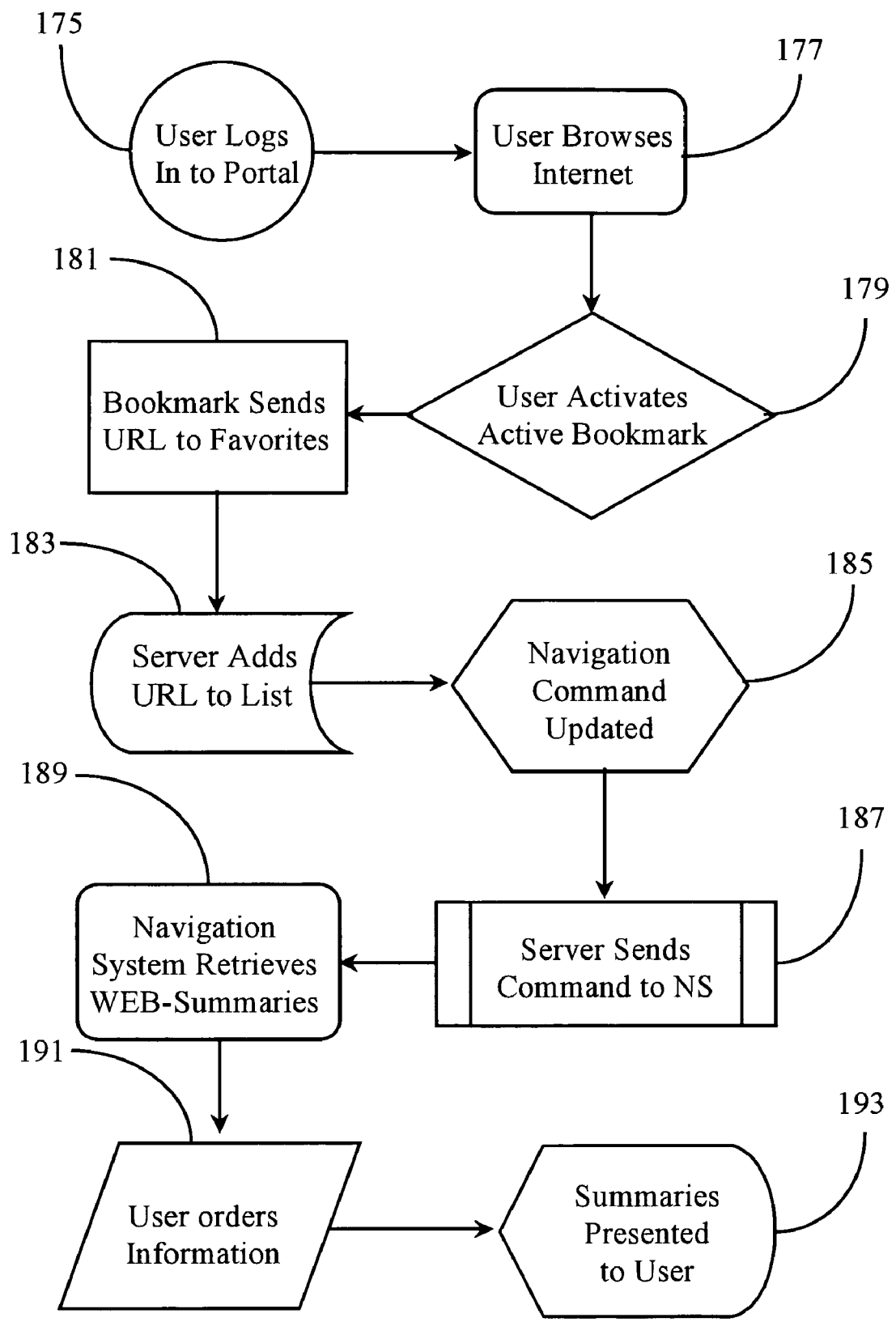
FIG. 9 is a flow diagram illustrating user and server side steps for practicing active book-marking and WEB-summarization of book-marked URLs.

FIG. 9 is a flow diagram illustrating user and server side steps for practicing active book-marking and WEB-summarization of book-marked URLs. At step 175, a user logs into a portal server analogous to portal server 145 of FIG. 7. At step 177, a user browses the Internet through the portal server of step 175. During normal browsing described in step 177, a user activates active-bookmark software in step 179 each time he or she desires to add a URL to a list of stored URLs. This function may be generally described by a user invoking module 167 from within application 153 of FIG. 8 at the time a Web page is displayed in the associated browser window.

At step 181, ABS automatically sends the associated URL to list 161 within server application 155 described in FIG. 8. At step 183 the URL is added to list 161 according to enterprise rules. In and integrated embodiment, the same URL may also be included in a user's standard bookmarks held on his or her own Internet appliance. Step 181 may optionally include a sub-routine for allowing a user to categorize the sent URL such that it is added to list 161 of FIG. 8 according to specific criteria. For example, if the URL is associated with a sports page, a user may elect to insert it under a headline of sports present in list 161. In one embodiment of the present invention, a parsing function may be utilized to automatically insert a sent URL under an appropriate heading present or created in list 161 at the time of receipt of the URL.

At step 185, a navigation command is updated to include a new URL. In one embodiment, URLs managed in list 161 are automatically added to the navigation command, which is executed on a periodic basis. In another embodiment, a user may select which URLs will be included in any navigation command. At step 187 the portal server of step 175 sends a navigation command to a navigation system server analogous to an NS 147 of FIG. 7. This occurs on a periodic basis with the frequency of occurrence to be determined by a user. At step 189, NS 147 of FIG. 7 navigates to each included URL for the purpose of obtaining and returning Web summaries. Web summaries are held for users an association with the URLs connected to them.

At step 191, a user may order summary information. Step 191 occurs at the discretion of a user. Web summaries may be ordered through simple activation of a module such as module 173 of FIG. 8. At step 193, ordered summaries are presented to a requesting user. Summaries may be presented in the form of HTML on a Web page created for a user. Such a Web page may contain listed URLs and summary information inserted beneath each associated URL. Inter-activity may also be present such that a user may click on a summary heading presented in the Web page described above to automatically navigate to the URL and view detailed information summarized by the heading.

It will be apparent to one with skill in the art that the steps illustrated herein may be added to or subtracted from without departing from the spirit and scope of the present invention. For example, a subroutine may be inserted between steps 179 and 181 wherein a user may direct how-to organize the URL sent in step 181. A routine may be inserted between step 185 and step 187 wherein a pop-up window or the like may appear on a user's display asking the user to confirm the URLs included in the navigation command. At this point, a user may manually delete or add URLs to the navigation command. The inventor intends that the process illustrated herein represents just one possible process for practicing the present invention. The process steps illustrated herein may change in order and description depending on the specific embodiment for which the processes created.

In practicing the present invention, in yet another aspect, the system of the invention has been integrated with the automatic registration aspects of the patent application cross-referenced above, specifically U.S. Ser. No. 09/550,348. In the cross-referenced application a method and apparatus is provided for populating and submitting electronic forms by proxy over a data-packet-network. The apparatus comprises a software application running on a system of network-connected servers that enables a user, connected in session with one of the servers, to navigate to a site containing an electronic form and obtain data about the site and about the form. The data obtained is used in conjunction with data about the user to construct a machine readable job order upon user request that may be executed for the purpose of automatic form population and submission to a host sponsoring the site. Upon acceptance of the submitted form, data used for passwords, log-in codes and user-names is returned to a data repository where it is entered along with specific site data as a new registered site item for a registering user such that future navigation to the site, auto log-in and data return may be performed automatically on behalf of the user. For those sites added for data-gathering in embodiments of the present invention that require log-in, the auto log-in features disclosed are provided in a preferred embodiment.

The method and apparatus of the present invention may be practiced via private individuals on the Internet, businesses operating on a WAN connected to the Internet, businesses operating via private WAN, and so on. There are many customizable situations.

The present invention as taught herein and above should be afforded the broadest of scope. The spirit and scope of the present invention is limited only by the claims that follow.

What is claimed is:

1. A system for network-based management and data summarization by a third party system for a client comprising:
   a client-side component capturing URLs and username and password pairs entered by the client for login during Internet navigation by the client to two or more websites;
   a server-side component operating at the third party system receiving the captured URLs and associated username and password pairs used to log on to those individual Websites from the client-side component for each of the individual websites captured by the client-side component; and
   a navigation and data-gathering component executed by the third party system navigating to the websites associated with the captured URLs and username and password pairs, logging in as the user, and gathering information from the Web pages.

2. The system of claim 1, wherein the network is the Internet network.

3. The system of claim 2, wherein the client-side component is a network-capable utility separate from a standard book-marking utility.

4. The system of claim 2, wherein the client-side component is integrated with a standard book-marking utility.

5. The system of claim 2, wherein the client-side component is a plug-In adapted to a Web browser.

6. The system of claim 2, wherein the navigation and data-gathering component navigates to a WEB page associated with the URL and returns an HTML summary of information from the Web page.

7. A computer implemented method for practicing network-based management and data summarization by a third party system for a client comprising the steps of:
   (a) capturing, by a first software-enabled computer function transparent to the client, URLs and user name and password pairs associated with Web pages during Internet navigation by the client to two or more Websites;
   (b) sending, by a second software-enabled computer function transparent to the user, the captured URLs and user name and password pairs to a third party system over a network connection to a Web-based server;
   (c) associating the captured URLs with other URLs contained in a list of URLs at the Web-based server;
   (d) initiating a request referencing the URLs and sending the request to a proxy navigation and data-gathering utility; and
   (e) navigating to a Web page or pages associated with the URLs, logging in using the user name and password pairs, and obtaining specific content and other data from the Web page and returning the data in summary form to the client, all by a third software-enabled computer function.

8. The method of claim 7 wherein in step (a), the URL is sent both to the network and to a machine cache residing on a user's machine.

9. The method of claim 7 wherein in step (b), the Web-based server is a proxy server.

10. The method of claim 7 wherein a step is added between steps (d) and (e) enabling a user to edit a navigation request.

* * * * *